United States Patent
Chong et al.

(10) Patent No.: US 8,780,121 B2
(45) Date of Patent: Jul. 15, 2014

(54) GRAPHICS RENDER CLOCK THROTTLING AND GATING MECHANISM FOR POWER SAVING

(75) Inventors: Lai Kuan Chong, Penang (MY); Lai Guan Tang, Penang (MY)

(73) Assignee: Intel Corporation, Santa Clara, CA (US)

( * ) Notice: Subject to any disclaimer, the term of this patent is extended or adjusted under 35 U.S.C. 154(b) by 870 days.

(21) Appl. No.: 12/908,308

(22) Filed: Oct. 20, 2010

(65) Prior Publication Data
US 2011/0148887 A1    Jun. 23, 2011

(30) Foreign Application Priority Data
Dec. 22, 2009    (MY) ................................ PI 20095512

(51) Int. Cl.
| G06F 15/00 | (2006.01) |
| G06T 1/00 | (2006.01) |
| G06F 15/16 | (2006.01) |
| G09G 5/36 | (2006.01) |
| G09G 5/37 | (2006.01) |
| G06F 1/00 | (2006.01) |
| G06F 1/26 | (2006.01) |

(52) U.S. Cl.
USPC ........... 345/502; 345/501; 345/559; 345/561; 713/320; 713/300

(58) Field of Classification Search
None
See application file for complete search history.

(56) References Cited

U.S. PATENT DOCUMENTS

| 7,039,819 | B1 * | 5/2006 | Kommrusch et al. | ......... 713/322 |
| 7,958,483 | B1 * | 6/2011 | Alben et al. | .................. 716/133 |
| 2005/0289377 | A1 * | 12/2005 | Luong et al. | .................. 713/322 |
| 2009/0172439 | A1 | 7/2009 | Cooper et al. | |

* cited by examiner

Primary Examiner — Maurice L McDowell, Jr.
Assistant Examiner — Donna J Ricks
(74) Attorney, Agent, or Firm — Jordan IP Law, LLC

(57) ABSTRACT

An example of a controller circuit may include a policy module to generate a power reduction policy output based on a processor power state input. The power reduction policy output may also be generated based on a graphics render engine idleness input. The circuit can also include a clock masking cell to apply a clock masking configuration to a graphics render clock trunk based on the power reduction policy output.

24 Claims, 4 Drawing Sheets

FIG. 4
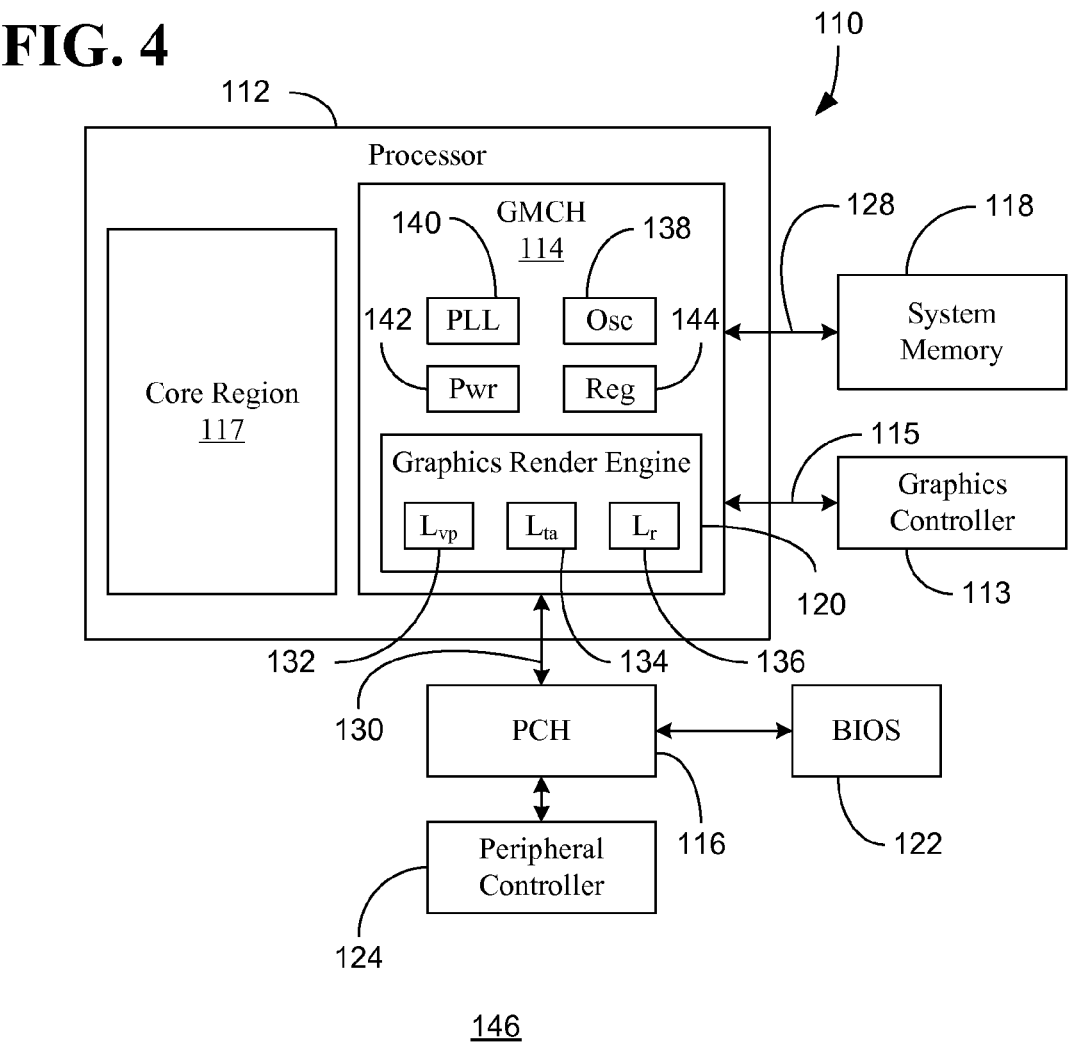
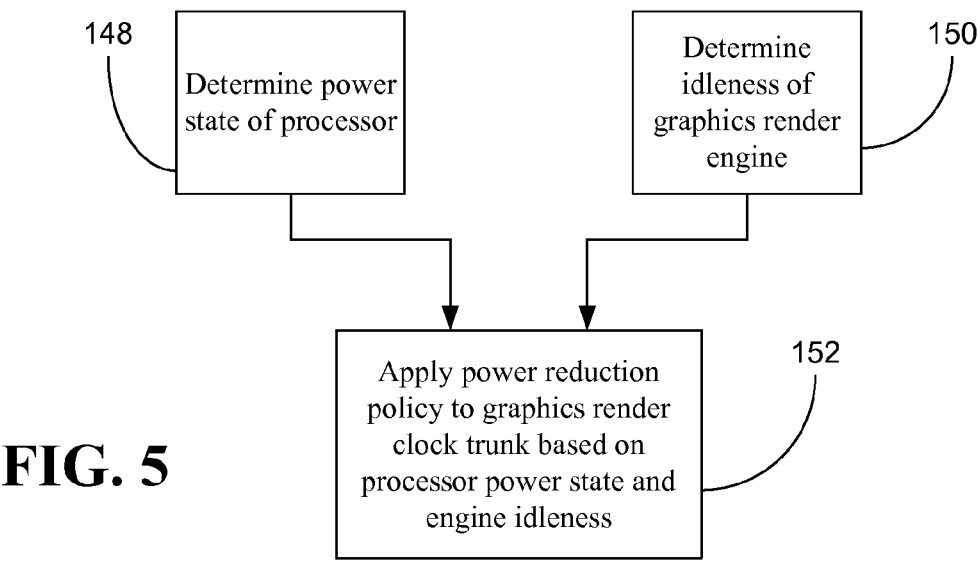
FIG. 5

GRAPHICS RENDER CLOCK THROTTLING AND GATING MECHANISM FOR POWER SAVING

PRIORITY CLAIM

This application claims priority to Malaysian Patent Application PI 20095512, filed Dec. 22, 2009, titled "GRAPHICS RENDER CLOCK THROTTLING AND GATING MECHANISM FOR POWER SAVING," which is incorporated herein by reference in its entirety.

TECHNICAL FIELD

Embodiments generally relate to the reduction of power consumption in computing platforms. In particular, embodiments relate to throttling and gating graphics render clocks to reduce power consumption.

DISCUSSION

As the use of system-on-chip (SoC) architectures in computing platforms increases, the importance of power saving techniques to system designs may also grow. For example, although processor-based power reduction techniques such as low power state operation may be available, other functionality such as graphics rendering can constitute a significant portion of the total idle/average power in a given system.

BRIEF DESCRIPTION OF THE DRAWINGS

The various advantages of the embodiments of the present invention will become apparent to one skilled in the art by reading the following specification and appended claims, and by referencing the following drawings, in which:

FIG. 4 is a block diagram of an example of a system according to an embodiment; and FIG. 5 is a flowchart of an example of a method of controlling a graphics render clock trunk according to an embodiment.

DETAILED DESCRIPTION

Embodiments of the present invention provide for a system including a processor, a graphics render engine and a graphics memory controller, wherein the graphics render engine receives and/or operates based on a graphics render clock. The graphics memory controller can have a policy module, a masking multiplexer and a clock masking cell, where the policy module may generate a power reduction policy output based on a processor power state input. The masking multiplexer can sequentially select a masking register input from a plurality of masking register inputs based on a clock window input corresponding to a trunk of the graphics render clock. The clock masking cell may apply successive masking register inputs to successive clock edges of the graphics render clock trunk based on the power reduction policy output.

Other embodiments provide for a controller circuit including a policy module to generate a power reduction policy output based on a processor power state input. In addition, the power reduction policy output can be generated based on a graphics render engine idleness input. The circuit may also include a clock masking cell to apply a clock masking configuration to a graphics render clock trunk based on the power reduction policy output.

Other embodiments provide for a method in which a power state of a processor is determined. An idleness of a graphics render engine may also be determined. A power reduction policy can be applied to a graphics render clock trunk based on the power state of the processor and the idleness of the graphics render engine.

In addition, embodiments provide for an apparatus having logic to determine a power sate of a processor and an idleness of a graphics render engine. The logic may also apply a power reduction policy to a graphics render clock trunk based on the power state of the processor and the idleness of the graphics render engine.

Figure 1:
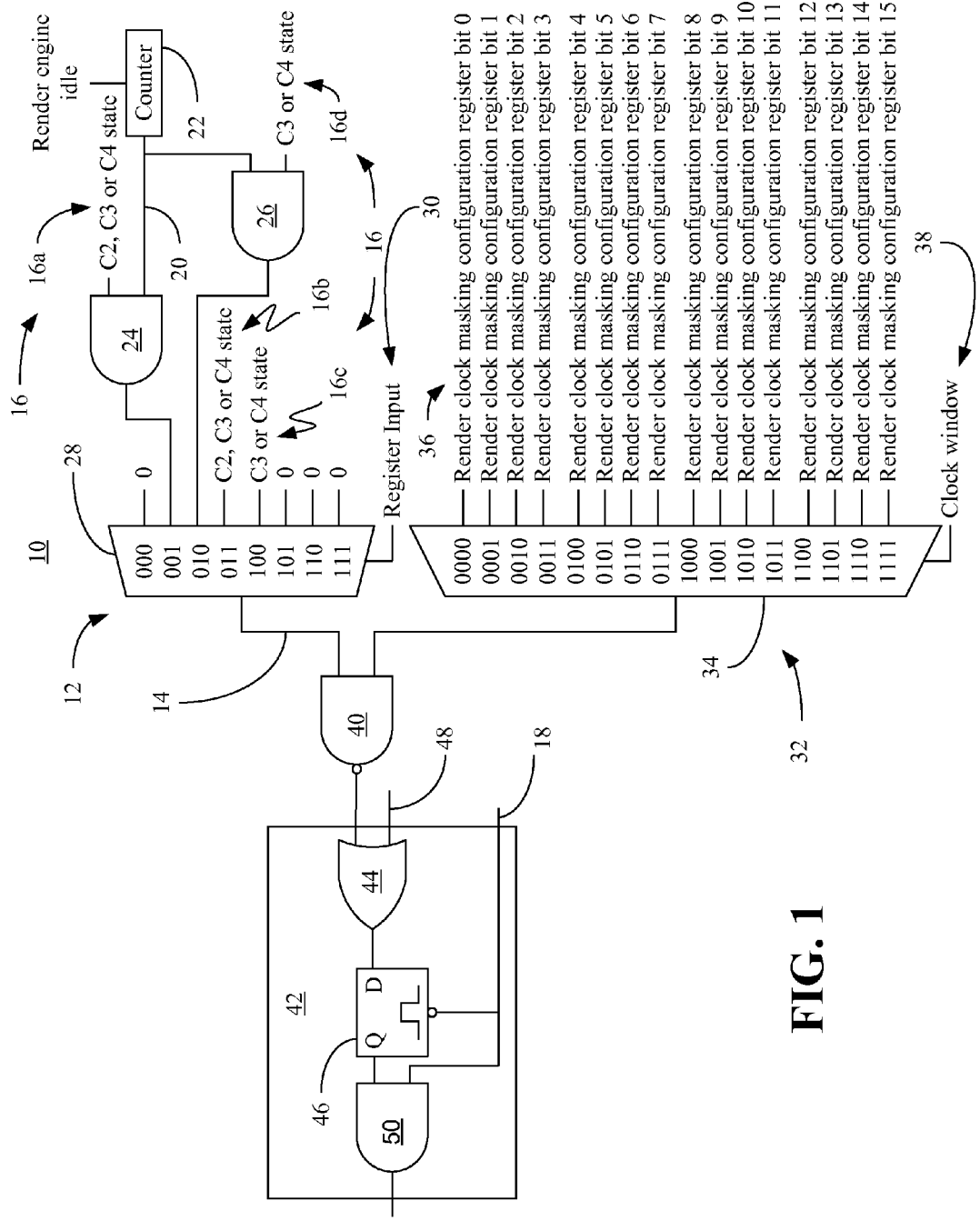
FIG. 1 is a schematic diagram of an example of a power reduction circuit according to an embodiment.

FIG. 1 shows a circuit 10 having a policy module 12 that is configured to generate a power reduction policy output 14 based on a processor power state input such as one of the power state inputs 16 (16a-16d). The power state input 16 could represent an Advanced Configuration and Power Interface Specification (ACPI Specification, Rev. 4.0, Jun. 16, 2009) low power state, where processor power states (Cx states) may be processor power consumption and thermal management states within a global working state. Although certain embodiments may be described with reference to ACPI Cx states being used as low power states, the embodiments are not so limited. Indeed, the principles described herein can be useful with any type of processor low power state protocol. Notwithstanding, there are a number of embodiments for which ACPI Cx states are well suited.

The policy module 12 may also generate the power reduction policy output 14 based on a graphics render engine idleness input 20. In particular, the illustrated policy module 12 includes a counter 22 to determine whether a graphics render engine has been idle for a predetermined time period. The counter 22 can therefore be used to ensure that there are no residual transactions in the render engine pipeline upon idle indication. The policy module 12 may use an AND gate 24 to evaluate the processor power state input 16a and the graphics render idleness input 20, and use an AND gate 26 to evaluate the processor power state input 16d and the graphics render idleness input 20. The illustrated policy module 12 also includes a policy multiplexer 28 that selects the power reduction policy output 14 from a plurality of power reduction policy outputs based on a policy register input 30. Thus, the policy register input 30, which may be obtained from a policy register (not shown) that is set by the basic input/output system (BIOS) at start-up, could select any one of five power reduction policy options as identified below in Table 1.

TABLE 1

| Option | Description |
| --- | --- |
| 000 | Disable render engine clock trunk throttling and gating. |
| 001 | Enable render engine clock trunk gating on render engine idle in C2, C3, C4 |
| 010 | Enable render engine clock trunk gating on render engine idle in C3, C4 |
| 011 | Enable render engine clock trunk throttling only in C2, C3, C4 (regardless of render engine idleness) |
| 100 | Enable render engine clock trunk throttling only in C3, C4 (regardless of render engine idleness) |

For example, if the policy register (not shown) contains the value of 001, render engine clock trunk gating may be implemented if the graphics render engine is idle for the predetermined time period and the processor is in low power state C2, C3 or C4. By contrast, if the policy register (not shown) contains the value of 011, render engine clock trunk throttling may be implemented if the processor is in low power state C2, C3 or C4, regardless of the idleness of the graphics render engine. The use of the policy multiplexer 28 can therefore enable greater flexibility in the design and operation of the circuit 10 as well as the functionality of the overall platform.

The circuit 10 may also include a masking module 32 having a masking multiplexer 34 that sequentially selects a masking register input from a plurality of masking register inputs 36 based on a clock window input 38 that corresponds to the graphics render clock trunk. The render engine clock trunk may be the clock on which the graphics render engine operates, before it is distributed to the various logic regions of the graphics render engine and/or graphics controller. In the illustrated example, the clock window 38 provides a 16-clock window count and the inputs of the masking multiplexer 34 are wired to sixteen-bit values that may be set in a masking configuration register (not shown) by the BIOS at boot-up. A 16-clock window is used herein to facilitate discussion only, and larger or smaller clock windows may be used without parting from the spirit and scope of the embodiments described.

Thus, if the selected power reduction policy is satisfied, the power reduction policy output 14 may assert, while the desired graphics render clock trunk masking configuration from the masking register inputs 36 is applied, via a NAND gate 40 and a clock masking cell 42 to a graphics render clock trunk 18. In particular, the clock masking cell 42 may include an OR gate 44 that will toggle a latch 46 with an active low enable based on the signal from the NAND gate 40 and a bypass signal 48 that enables the clock trunk to be kept running even if the power reduction policy is satisfied. The output of an AND gate 50 may therefore be a gated or throttled graphics render clock trunk as a result of the application of the render clock masking configuration in accordance with the selected power reduction policy. Thus, the clock masking cell 42 can provide for significant power reduction through clock gating or clock throttling.

Figure 2:
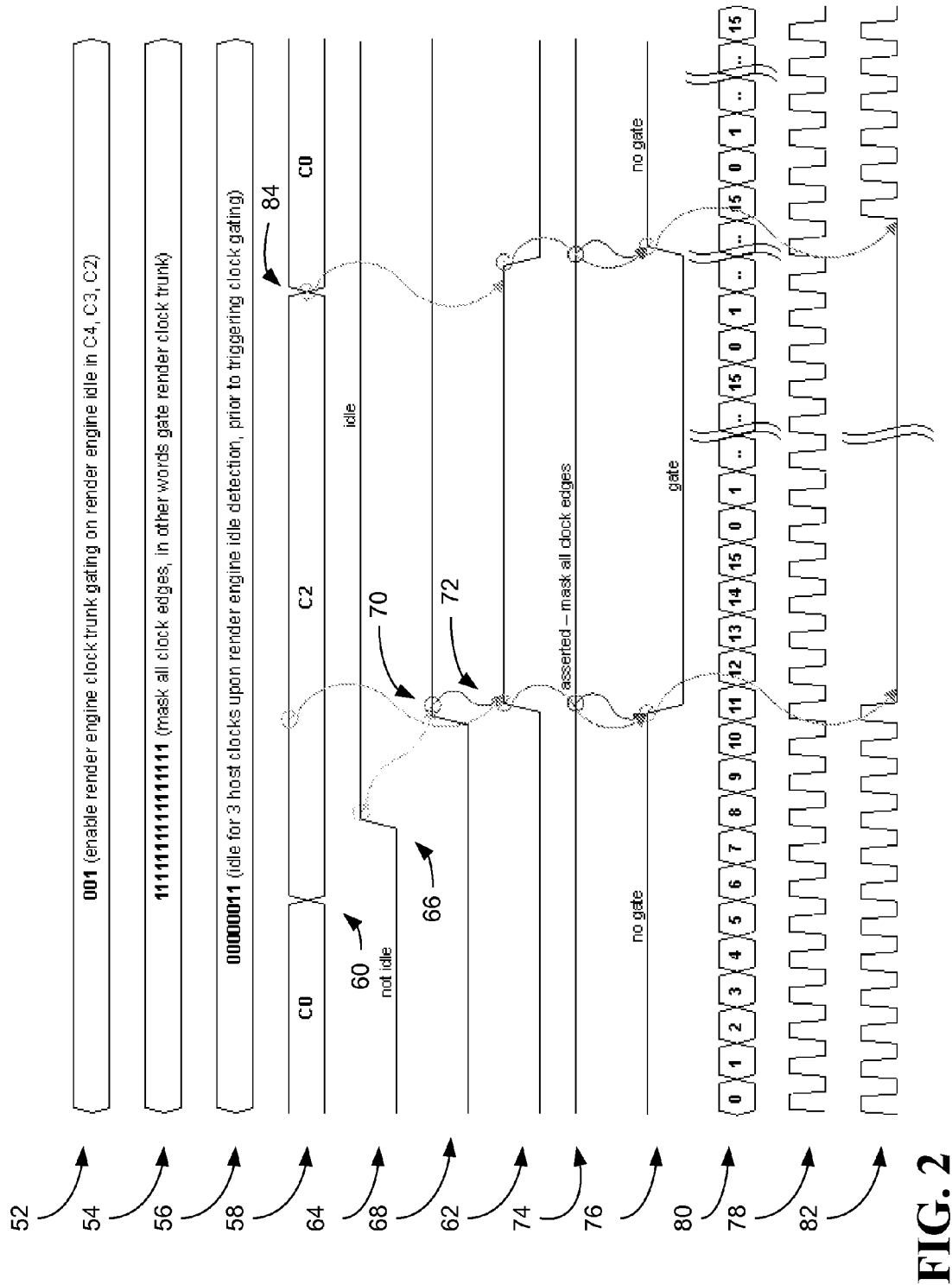
FIG. 2 is a waveform diagram of an example of a graphics render clock trunk gating scheme according to an embodiment.

Turning now to FIG. 2, a waveform diagram is shown for an example of an approach to render engine clock trunk gating if the graphics render engine is idle and the processor is in the C2, C3, or C4 low power states (e.g., Option 001 in Table 1). In the illustrated example, a policy register signal 52 provides the value of "001" and a masking configuration register signal 54 provides the value of "1111111111111111", which will mask all clock edges (e.g., gate the graphics render clock trunk). An idle time before gating configuration register signal 56 may ensure that the graphics render engine is idle for three host clocks before the graphics render engine is deemed to be idle. Such a technique may effectively provide a safety net to protect against lingering busy conditions or residual transactions that might be missed in an idle indication from the graphics render engine. The gating configuration register signal 56 may be also programmed via a register (e.g., 8-bits register ranging from 00000000 for zero host clock of delay, to 11111111 for 256 host clock of delay).

A processor state signal 58 demonstrates that the processor may switch from the C0 state to the C2 state at transition 60. A gating enable signal 62 may not undergo a transition at this point, however, because an illustrated render engine idle signal 64 has not yet asserted. When the render engine idle signal 64 asserts at transition 66, the delay time period defined by the gating configuration register signal 56 is permitted to expire.

At such time, a gating counter signal 68 may undergo a transition 70, which can in turn trigger a transition 72 in the gating enable signal 62 because all of the conditions for the power reduction policy have been satisfied. Thus, a masking edge signal 74 may be applied to a free running, ungated render clock trunk signal 78 in response to a render clock gate enable signal 76 switching to a gate enable condition. The illustrated ungated render clock trunk signal 78 is synched via a 16-clock window count signal 80 (e.g., a free running phase count that repeats every sixteen render clocks), and a gated render clock trunk signal 82 may result. At an illustrated transition 84, the processor state signal switches back to the C0 state, causing clock gating to be deactivated and the render clock trunk to resume normal toggling.

Figure 3:
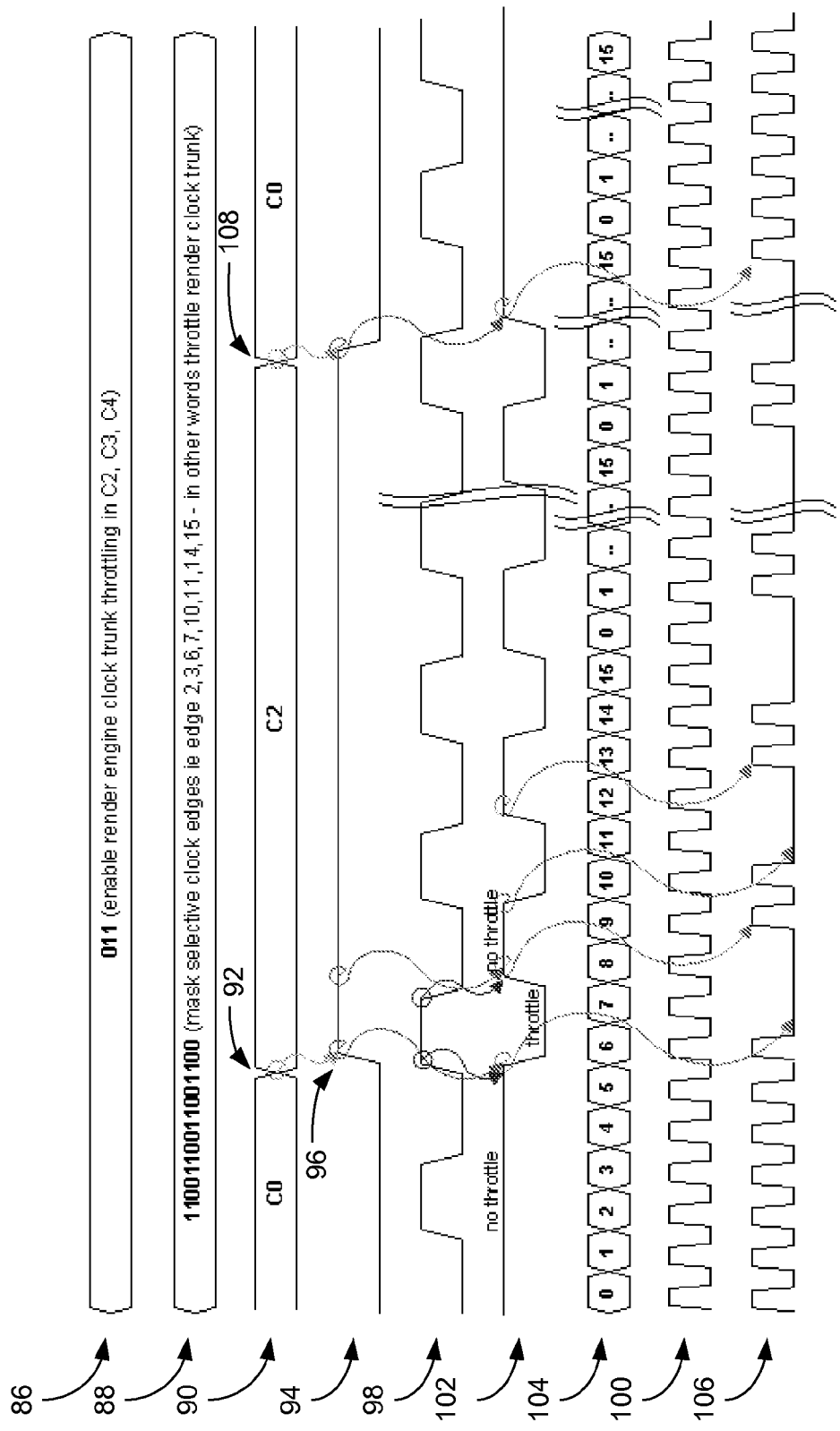
FIG. 3 is a waveform diagram of an example of a graphics render clock trunk throttling scheme according to an embodiment.

FIG. 3 shows a waveform diagram for an example of an approach to render engine clock trunk throttling if the processor is in the C2, C3 or C4 low power states (e.g., Option 011 in Table 1). In the illustrated example, a policy register signal 86 provides the value of "011" and a masking configuration register signal 88 provides the value of "1100110011001100", which will selectively mask clock edges 2, 3, 6, 7, 10, 11, 14, and 15 (e.g., throttle the graphics render clock trunk). A processor state signal 90 demonstrates that the processor may switch from the C0 state to the C2 state at transition 92. An illustrated throttle enable signal 94 then undergoes a transition 96 because the conditions of the power reduction policy have been satisfied. Thus, a masking edge signal 98 may be applied to a free running, ungated render clock trunk signal 100 in response to a render clock throttle enable signal 102 switching to a throttle enable condition. As already noted, the ungated render clock trunk signal 100 can be synched via a 16-window count signal 104, where a gated render clock trunk signal 106 may result. At an illustrated transition 108, the processor state signal switches back to the C0 state, causing clock throttling to be deactivated and the render clock trunk to resume normal toggling.

Turning now to FIG. 4, a computing system 110 is shown. The system 110 may be a portion of a computing platform such as a server, desktop, test system, design/debug tool, laptop, personal digital assistant (PDA), wireless smart phone, media player, imaging device, or any other suitable apparatus. In the illustrated example, the system 110 includes a processor 112, a graphics memory controller hub (GMCH) 114, a graphics controller 113, a platform controller hub (PCH) 116, system memory 118, a graphics render engine 120, basic input/output system (BIOS) memory 122 and one or more peripheral controllers 124. The processor 112, which may include a core region 117 with one or several processor cores, may be able to enter its cores into one or more active and/or idle states based on performance and/or power management concerns. The illustrated processor 112 is integrated with the GMCH 114 onto a common system on chip (SoC). Alternatively, the processor 112 could communicate with the GMCH 114 over an interface such as a front side bus (FSB), a point-to-point interconnect fabric, or any other suitable interface. The GMCH 114, which is sometimes referred to as a Northbridge, can communicate with the system memory 118 via a memory bus 128, wherein the system memory 118 might include dynamic random access memory (DRAM) modules that could be incorporated into a single inline memory module (SIMM), dual inline memory module (DIMM), small outline DIMM (SODIMM), and so on.

The GMCH 114 may also communicate with the graphics controller 113 via a graphics bus 115 such as a PCI Express Graphics (PEG, e.g., Peripheral Components Interconnect/ PCI Express x16 Graphics 150W-ATX Specification 1.0, PCI Special Interest Group) bus, or Accelerated Graphics Port (e.g., AGP V3.0 Interface Specification, September 2002) bus. The GMCH 114 may also communicate with the PCH 116, which may be referred to as a Southbridge, over a hub bus 130. In one embodiment, the hub bus 30 is a DMI (Direct Media Interface) bus. The PCH 116 could also be incorporated with the processor 112 and GMCH 114 onto a common SoC. The illustrated system 110 also has one or more peripheral controllers 124 such as a Wi-Fi (e.g., Institute of Electronics Engineers/IEEE 802.11a, b, g, n) network interface, an Ethernet controller (e.g., IEEE 802.3), PC Card controller (e.g, CardBus PCMCIA standard), and so on.

The PCH 116 may also have internal controllers such as USB (Universal Serial Bus, e.g., USB Specification 2.0, USB Implementers Forum), Serial ATA (SATA, e.g., SATA Rev. 3.0 Specification, May 27, 2009, SATA International Organization/SATA-IO), High Definition Audio, and other controllers. The PCH 116 may be able to place the cores of the processor 112 in one or more low power states to reduce power consumption by issuing various power state control signals to a voltage regulator (not shown) that supplies an operating voltage to the processor 112. Alternatively, the processor 112 itself could place the cores in the various low power states and inform the PCH 116 and/or GMCH 114 of its low power state status. In one embodiment, a chipset defined by the GMCH 114 and PCH 116 may include one or more blocks (e.g., chips or units within an integrated circuit) to perform various interface control functions (e.g., memory control, graphics control, I/O interface control, and the like). As already noted, these circuits may be implemented on one or more separate chips and/or may be partially or wholly implemented within the processor 112.

The illustrated graphics render engine 120, which is integrated with the GMCH 114 and processor 112 on to a common SoC, includes a wide variety of logic such as vertex processing logic ($L_{vp}$) 132, texture application logic ($L_{ta}$) 134, and rasterization logic ($L_r$) 136. This logic, while significantly enhancing graphics performance, may constitute a relatively large portion of the overall power consumption of the processor 112. The illustrated GMCH 114 uses an oscillator 138 and a phase locked loop (PLL) 140 to generate a graphics render clock trunk, which may be distributed to the individual units of logic 132, 134, 136, within the graphics render engine 120. Throttling and/or gating the graphics render clock trunk as described herein may therefore provide significant power savings. Accordingly, the GMCH 114 may include a power circuit 142 such as the circuit 10 (FIG. 1), already discussed. In the illustrated example, BIOS memory 122 is programmed to write the appropriate values to registers 144 that include a policy register, an idleness delay register and a masking register, as already discussed. For example, if the BIOS memory 122 programs the policy register with the value of "001", render engine clock trunk gating might be implemented, wherein the masking register values could be set to "1111111111111111". By contrast, if the BIOS memory 122 programs the policy register with the value of "011", render engine clock trunk throttling might be implemented, wherein the masking register values could be set to "1100110011001100". In addition, the GMCH 114 may obtain the aforementioned processor power state input from the PCH 116 and/or the processor 112.

As already noted, the system 110 may implement a variety of different computing devices or other appliances with computing capability. Such devices include but are not limited to test systems, design/debug tools, laptop computers, notebook computers, PDAs, cellular phones, audio and/or video media players, desktop computers, servers, and the like. The system 110 could constitute one or more complete computing systems or alternatively, it could constitute one or more components useful within a computing system.

Turning now to FIG. 5, a method 146 of controlling a graphics render clock trunk is shown. The method 146 may be implemented in fixed-functionality hardware, microcode, software, or any combination thereof. For example, hardware implementations might involve the use of circuit technology such as application specific integrated circuit (ASIC), complementary metal oxide semiconductor (CMOS) or transistor-transistor logic (TTL) technology, or any combination or variation thereof. Processing block 148 provides for determining a power state of a processor. As already noted, such a task may involve receiving a processor power state input, via interrogating or otherwise communicating with, the processor, PCH, or other platform component. Block 150 provides for determining an idleness of a graphics render engine. Such a determination might be made by receiving a graphics render engine idleness input. In one example, the two inputs may be received at a GMCH that is integrated with the processor and the graphics render engine onto a common SoC.

A power reduction policy may be applied to a graphics render clock trunk at block 152 based on the power state of the processor and the idleness of the graphics render engine. As already discussed, applying the power reduction policy could include throttling the graphics render clock trunk if the processor is in a low power state. If such an approach is used, the idleness determination at block 150 may be circumvented and/or omitted. Applying the power reduction policy may also include gating the graphics render clock trunk if the processor is in a low power state and an idleness condition of the graphics render engine is satisfied. The idleness condition could include the graphics render engine being idle for a predetermined time period. As also already discussed, application of the power reduction policy could entail applying a clock edge masking configuration to one or more clock edges of the graphics render clock trunk. Other clock throttling and/or gating techniques may also be used. For example, to the extent to which the oscillator 138 (FIG. 4) and/or PLL (FIG. 4) are dedicated to the graphics render engine or its logic 132, 134, 136 (FIG. 4), those components may be powered down or otherwise disabled.

Thus, instances in which the processor is in a non-executing mode can be leveraged when the clocks of other power-intensive devices such as graphics render engines are reduced in frequency (e.g., throttled) or totally zeroed out (e.g., gated). The result is a reduction or elimination of the toggle rate of targeted clock registers and a lowering of dynamic power consumption. Moreover, the use of registers and BIOS programming enables post-silicon optimization of power saving versus performance or functionality of the integrated graphics. For more aggressive power saving, clock gating may be the appropriate choice. On the other hand, if gating is not permissible or desired, a clock throttling scheme may be used. In either case, the configuration can be programmable after fabrication of the platform.

Embodiments described herein are applicable for use with all types of semiconductor integrated circuit ("IC") chips. Examples of these IC chips include but are not limited to processors, controllers, chipset components, programmable logic arrays (PLA), memory chips, network chips, and the like. In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A system comprising:
a platform controller;
a processor coupled to the platform controller;
a graphics render engine having at least one of vertex processing logic, texture application logic and rasterization logic to operate based on a graphics render clock; and
a graphics memory controller having a policy module, a masking multiplexer, and a clock masking cell, the policy module to generate a power reduction policy output based on a processor power state input, the masking multiplexer to sequentially select a masking register input from a plurality of masking register inputs based on a clock window input corresponding to a graphics render clock trunk, and the clock masking cell to apply successive masking register inputs to successive clock edges of the graphics render clock trunk based on the power reduction policy output.

2. The system of claim 1, wherein the power reduction policy output and the plurality of masking register inputs are to throttle the graphics render clock trunk if the processor is in a low power state.

3. The system of claim 1, wherein the policy module is to generate the power reduction policy output further based on a graphics render engine idleness input.

4. The system of claim 3, wherein the power reduction policy output and the plurality of masking register inputs are to gate the graphics render clock trunk if the processor is in a low power state and an idleness condition of the graphics render engine is satisfied.

5. The system of claim 3, wherein the policy module further includes a counter to determine whether the graphics render engine has been idle for a predetermined time period, the policy to generate the power reduction policy output based on whether the graphics render engine has been idle for the predetermined time period.

6. The system of claim 3, wherein the policy module further includes an AND gate to evaluate the processor power state input and the graphics render engine idleness input.

7. The system of claim 1, wherein the policy module further includes a policy multiplexer to select the power reduction policy output from a plurality of power reduction policy outputs based on a policy register input.

8. The system of claim 7, further including:
a policy register to provide the policy register input;
a masking register to provide the plurality of masking register inputs; and
a basic input/output system (BIOS) memory programmed to write a policy register value to the policy register and a plurality of masking register values to the masking register.

9. A circuit comprising:
a policy module to generate a power reduction policy output based on a processor power state input and a graphics render engine idleness input, wherein the policy module further includes an AND gate to evaluate the processor power state input and the graphics render engine idleness input; and
a clock masking cell to apply a clock masking configuration to a graphics render clock trunk based on the power reduction policy output.

10. The circuit of claim 9, wherein the policy module further includes a counter to determine whether the graphics render engine has been idle for a predetermined time period, the policy module to generate the power reduction policy output based on whether the graphics render engine has been idle for the predetermined time period.

11. The circuit of claim 9, wherein the policy module further includes a policy multiplexer to select the power reduction policy output from a plurality of power reduction policy outputs based on a policy register input.

12. The circuit of claim 11, further including a policy register to provide the policy register input.

13. The circuit of claim 9, further including a masking multiplexer to select a masking register input from a plurality of masking register inputs based on a clock window input corresponding to the graphics render clock trunk, the clock masking cell to apply successive masking register inputs to successive clock edges of the graphics render clock trunk based on the power reduction policy output.

14. The circuit of claim 13, further including a masking configuration register to provide the plurality of masking register inputs.

15. A method comprising:
  determining a power state of a processor;
  determining an idleness of a graphics render engine;
  determining a power reduction policy and a clock edge masking configuration based on one or more register values; and
  applying the power reduction policy to a graphics render clock trunk based on the power state of the processor and the idleness of the graphics render engine, wherein applying the power reduction policy includes applying the clock edge masking configuration to one or more clock edges of the graphics render clock trunk.

16. The method of claim 15, wherein applying the power reduction policy includes throttling the graphics render clock trunk if the processor is in a low power state.

17. The method of claim 16, wherein applying the power reduction policy further includes gating the graphics render clock trunk if the processor is in a low power state and an idleness condition of the graphics render engine is satisfied.

18. The method of claim 17, wherein the idleness condition includes the graphics render engine being idle for a predetermined time period.

19. The method of claim 16, wherein the low power state is an Advanced Configuration and Power Interface state.

20. An apparatus comprising:
  logic to,
    determine a power state of a processor;
    determine an idleness of a graphics render engine;
    determine a power reduction policy and a clock edge masking configuration based on one or more register values;
    apply the power reduction policy to a graphics render clock trunk based on the power state of the processor and the idleness of the graphics render engine; and
    apply the clock edge masking configuration to one or more clock edges of the graphics render clock trunk.

21. The apparatus of claim 20, wherein the logic is to throttle the graphics render clock trunk if the processor is in a low power state.

22. The apparatus of claim 21, wherein the logic is to gate the graphics render clock trunk if an idleness condition of the graphics render engine is satisfied.

23. The apparatus of claim 22, wherein the idleness condition is to include the graphics render engine being idle for a predetermined time period.

24. The apparatus of claim 21, wherein the low power state is an Advanced Configuration and Power Interface state.

* * * * *